Nov. 1, 1932.   C. R. MARSHALL ET AL   1,886,207
HOSE REEL
Filed Nov. 22, 1929
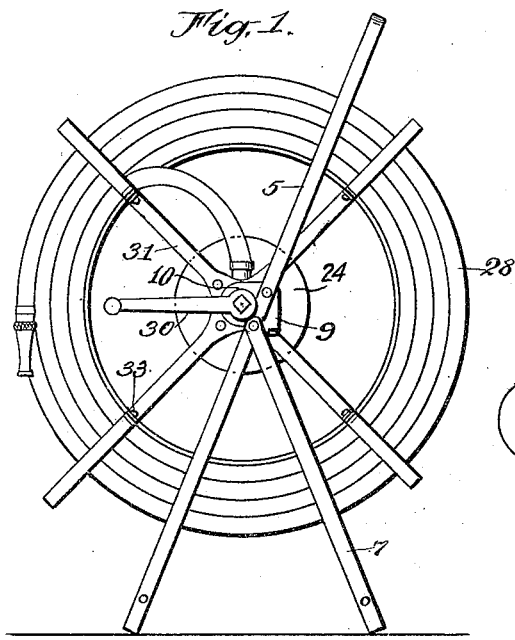
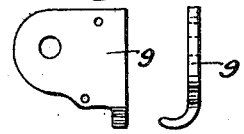
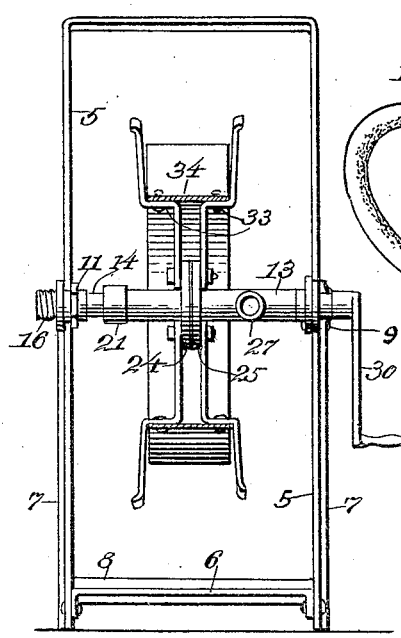
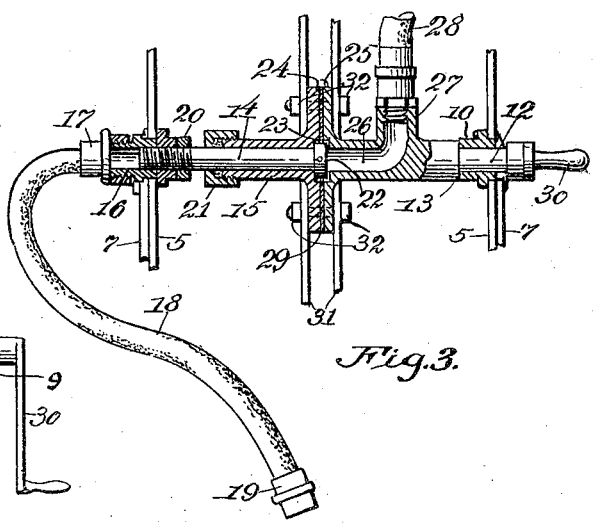
Inventor
Clyde R. Marshall
Frank D. Marshall
By J. M. St. John
Attorney Patented Nov. 1, 1932

1,886,207

UNITED STATES PATENT OFFICE

CLYDE R. MARSHALL, OF CEDAR RAPIDS, AND FRANK D. MARSHALL, OF CENTER POINT, IOWA

HOSE REEL

Application filed November 22, 1929. Serial No. 409,000.

This invention relates to hose reels for domestic use, the object of the invention being to provide the householder with an easily portable reel for a garden hose capable of direct attachment to a sill-cock, and adapted to permit of the hose being reeled up thereon, beginning at the sill-cock end, and to allow for the free flow of water through the hose whether wholly or partially unreeled.

The invention consists in certain improvements in the construction of hose reels of this type, as will be hereinafter fully set forth and claimed.

In the accompanying drawing, forming a part of this specification, Fig. 1 is a side elevation of a hose reel embodying our invention. Fig. 2 is an elevation of the same as seen from the left side of Fig. 1, the hose being detached and a part of the reel in section. Fig. 3 is a sectional view, mainly central and longitudinal to the reel axle, showing details in the structure of the reel, its mounting, and connection with the sill-cock. Figs. 4 and 5 are face and edge views respectively of a stop member used to limit the spread of the reel supporting legs.

In the drawing, the numeral 5 denotes a rectangular frame formed of flat steel bent to U shape and connected near the lower end by a cross-bar 6. To this is pivoted a pair of legs 7 similarly connected near the lower ends by a cross-bar 8. The swing of the legs is limited outwardly by a shoulder 9 formed on each of the bearings which carry the reel. This movement of the legs admits of the reel being set high or low, as desired, the legs being foldable close to the main frame when not in use, or for convenience in shipping. The upper cross-member of the main frame serves as a convenient handle for carrying the reel from place to place.

Attached to the main supporting frame is a pair of bearings 10 and 11. The former is a simple bearing bored for a journal 12 forming a part of the reel axle 13. The latter bearing 11 is in the nature of a coupling, and carries an inwardly projecting tubular journal 14 around which a hollow section of the reel axle, 15, may revolve. The outer hub of the member 11 is formed as a nipple 16 to receive the coupler 17 of a short section of hose 18, provided with another coupler 19 at its free end, for connection with a sill-cock, not shown.

The tubular journal or spindle 14, as will be seen, is screwed into the member 11, and secured unturnably thereto by a set-nut 20. Its stem extends through the hollow hub 15, which is provided with a stuffing-box 21 to prevent leakage. The inner end of the spindle is provided with a retaining collar 22 seated in a recess 23 in the reel hub. This hub is formed as a pair of flanges 24 and 25, the latter formed on that part of the reel axle which carries the journal 12. A passageway 26 opens through this hub to a lateral outlet 27, and to this is connected in a familiar way the hose 28. The two halves of the reel hub are bolted together, and are made watertight by an interposed packing 29. The reel is turned for reeling up the hose, by a crank 30 attached to the journaled end of the reel axle.

The reel is formed of flat steel spokes 31 secured to the axle flanges by the same bolts 32 that bind the flanges together. At 33 the spokes are offset to make room for the hose, and to the offsets is riveted a band of sheet metal 34, which forms a cylindrical seat for the hose, which prevents any short bendings of the hose such as would tend to prevent the free flow of water through it, when wholly or partially reeled thereon.

It will be understood that the device is operated by standing it alongside a sill-cock and attaching the short length of hose thereto, the reel support being adjustable in height with reference to the sill-cock. The water may then be turned on, and as much or little of the hose as is needed may be unrolled and used for water distribution. When through at on side of the house, the hose is reeled up, and the whole rig carried by its handle to another sill-cock, or to its place of storage.

Having thus described our invention, we claim:

In a hose-reel, a supporting framework having oppositely arranged openings in a pair of sides thereof, a multi-piece axle extending through said openings and having a crank at one end thereof connected in driving relation to the proximate axle section, said axle including a fixed section and a pair of rotatable rigidly connected sections, one of which surrounds the fixed section and is rotatable thereon as a bearing, the axle sections being connected in water-tight relation, the fixed section being longitudinally apertured and being connected in water-tight relation with a water carrying hose, said rotatable axle sections being flanged at their proximate ends and having the flanges connected together in water-tight relation, and a reel drum carried by said flanges, one of said rigidly connected axle sections having a laterally extending tubular connection communicating with the aperture in the fixed section.

In testimony whereof we affix our signatures.

CLYDE R. MARSHALL.
FRANK D. MARSHALL.